(12) United States Patent
Daute et al.

(10) Patent No.: US 7,488,838 B2
(45) Date of Patent: Feb. 10, 2009

(54) ANTIFOGGING AGENT FOR PLASTICS

(75) Inventors: Peter Daute, Beverstedt (DE); Ernst-Udo Brand, Bremerhaven (DE)

(73) Assignee: Cognis Oleochemicals GmbH, Duesseldorf (DE)

( * ) Notice: Subject to any disclaimer, the term of this patent is extended or adjusted under 35 U.S.C. 154(b) by 329 days.

(21) Appl. No.: 11/199,967

(22) Filed: Aug. 9, 2005

(65) Prior Publication Data
US 2007/0021542 A1    Jan. 25, 2007

(30) Foreign Application Priority Data
Aug. 10, 2004   (DE)   ................ 10 2004 038 980

(51) Int. Cl.
*C07C 51/43*   (2006.01)
(52) U.S. Cl. ....................... 554/174; 524/308
(58) Field of Classification Search ................. None
See application file for complete search history.

(56) References Cited

U.S. PATENT DOCUMENTS

| | | | |
|---|---|---|---|
| 3,288,824 A | 11/1966 | Mahler et al. | |
| 3,356,621 A * | 12/1967 | Hopkins, Jr. et al. | ........ 521/131 |
| 4,388,307 A | 6/1983 | Cavanak | |
| 5,302,327 A * | 4/1994 | Chu et al. | ................... 264/448 |
| 6,294,192 B1 | 9/2001 | Patel et al. | |

FOREIGN PATENT DOCUMENTS

| | | |
|---|---|---|
| GB | 643765 A | 9/1950 |
| JP | 56-104953 A | 8/1981 |
| JP | 04-279643 A | 10/1992 |
| JP | 06-093139 A | 4/1994 |

OTHER PUBLICATIONS

Pardun, Chem. Abstr.,93:93663, 1980.*
Salomon, Chem. Abstr., 54:17856A, 1960.*
Plastics Additives Handbook, 5th Edition, Chapter 9, Hanser Verlag (2001), pp. 609-626.

* cited by examiner

*Primary Examiner*—Deborah D Carr
(74) *Attorney, Agent, or Firm*—Smith Moore Leatherwood LLP

(57) ABSTRACT

The invention relates to antifogging agents for plastics which are obtainable by transesterification of native oils with PEG or mixtures of PEG and other polyols, to plastics containing these antifogging agents and to the use of mixtures obtainable by transesterification of native oils with PEG or mixtures of PEG and other polyols as antifogging agents in plastics.

23 Claims, No Drawings

ANTIFOGGING AGENT FOR PLASTICS

CROSS-REFERENCE TO RELATED APPLICATIONS

This application claims priority from German application DE 102004038980.2 filed Aug. 10, 2004, the entire contents of which are incorporated herein by reference.

FIELD OF THE INVENTION

This invention relates generally to plastics and, more particularly, to an antifogging agent based on native oils, to the use of this antifogging agent for plastics, to a process for the production of the antifogging agent and to plastics containing the antifogging agent.

BACKGROUND OF THE INVENTION

Antifogging agents are commonly used in transparent packaging materials or films (Plastics Additives Handbook, 5th Edition, 2001, Hanser Verlag, pp. 609-626). Antifogging agents produce transparent layers on the packaging films by preventing the formation of water droplets on the plastic surface in the event of the condensation of water. Plastics generally have a high interfacial tension towards water and are therefore water-repellent, so that water in the form of droplets rather than a uniform film is deposited on the surfaces. In the absence of antifogging agents, the "fog" is formed on the inside of the goods wrapped in packaging films, so that the contents of the package are no longer visible. In addition, droplets of condensed water are a favorable medium for the proliferation of food-damaging germs and microorganisms.

Accordingly, it is desirable to reduce the surface tension of the plastics towards water which is done by hydrophilicizing the plastics. So-called "internal" and "external" antifogging agents are suitable for this purpose. Internal antifogging agents are directly added to the plastic while external antifogging agents are applied as a coating to the plastic surface. Although external antifogging agents are instantly effective, they are not long-lasting because they can simply be washed off or removed. Accordingly, a long-term effect can only be achieved with internal antifogging agents which are incorporated in the polymer matrix of the plastic and diffuse slowly to the surface of the substrate. Internal antifogging agents have to meet stringent compatibility requirements in particular in the food industry. Besides being compatible with foods, they have to be suitable for the processing of the plastics, i.e. heat-stable at the corresponding processing process temperatures. They must not adversely affect the transparency of the films or the printing and sealing properties of the films or lead to discolouration or odor emissions. In addition, ecologically safe, but economically favorable processes are becoming increasingly important in particular in the plastics-processing industry.

Accordingly, the problem addressed by the present invention was to provide an antifogging agent which would satisfy the various requirements mentioned above without having any of the disadvantages referred to.

DESCRIPTION OF THE INVENTION

The present invention relates to antifogging agents for plastics which are obtainable by transesterification of native oils with polyethylene glycols (PEG) or mixtures of PEG and other polyols.

It has been found that antifogging agents such as these can be produced very easily by transesterification of native oils in a one-pot process.

The native oils used for the production of the antifogging agents are understood to be naturally occurring oils of vegetable or animal origin. Such oils are generally triglycerides of $C_{10-24}$ fatty acids such as, for example, peanut oil, fish oil, linseed oil, palm oil, rapeseed oil, castor oil, colza oil, soybean oil, sunflower oil and/or safflower oil. Sunflower oil, colza oil, soybean oil and/or castor oil are preferably used.

The antifogging agents are produced by base-catalyzed transesterification of the oils with polyethylene glycols (PEG) or a mixture of PEG and other polyols. NaOH, KOH and, preferably, LiOH are used as catalysts.

The molecular weight of the PEG is between PEG 100 and PEG 3,000 and preferably between PEG 200 and PEG 1,000. The other polyols used may be selected from pentaerythritol, dipentaerythritol, tripenta-erythritol, bis-trimethylolpropane, inositol, polyvinyl alcohol, bis-trimethylol ethane, tris-trimethylol propane (TMP), sorbitol, maltitol, isomaltitol, lactitol, lycasin, mannitol, inositol, lactose, leucrose, tris-(hydroxyethyl)-isocyanurate (THEIC), palatinitol, tetramethylol cyclohexanol, trimethylol cyclopentanol, tetramethylol cyclopyranol, glycerol, diglycerol, polyglycerol or thiodiglycerol. Glycerol, TMP, sorbitol and pentaerythritol are particularly suitable. The ratio by weight of oil to PEG to polyol is 10:1:0 to 1:5:1.

Different mixtures of fatty acid/PEG esters, mono-, di- and triglycerides are formed according to the quantity ratios and the reaction conditions. These mixtures can readily be incorporated in plastics and are distinguished by high compatibility with foods. They may be used in any plastics, but especially in PVC, PP, PE and PET. They are added to the plastics in quantities of 0.05 to 10% by weight and preferably in quantities of 0.5 to 4% by weight.

Accordingly, the present invention also relates to plastics which contain these mixtures as antifogging agents and to the use of mixtures obtainable by transesterification of native oils with PEG or mixtures of PEG with other polyols as antifogging agents for plastics. These antifogging agents are mainly used as so-called "internal" antifogging agents.

The present invention also relates to a process for the production of antifogging agents for plastics, in which native oils are transesterified with PEG or mixtures of PEG with other polyols in a one-pot process in the presence of a base as catalyst. As a one-pot process, this process is distinguished by its particular economy and ecological compatibility.

EXAMPLES

Example 1

Transesterification of Colza Oil with PEG 600 and Glycerol 168.6 g colza oil, 114.1 g Polydiol 600, 17.5 g glycerol and 0.03 g LiOH·H$_2$O were introduced into a glass flask and heated with stirring to 235° C. After 1 h, a vacuum of 100 mbar was applied. After a reaction time of 2 hours, the reaction mixture was cooled and was then filtered after addition of 15 g filter aid and 15 g bleaching earth. Yield: 264 g of a clear yellow liquid.

Color 1" Lov. yellow=1.7, Lov. red=0.4
Acid value=0.31, saponification value=106.5, iodine value=63.4

Example 2

Transesterification of Colza Oil with PEG 600 (Example 2)

172.6 g colza oil, 127.4 g Polydiol 600 and 0.03 g LiOH·H$_2$O were introduced into a glass flask and heated with stirring to 235° C. After 1 h, a vacuum of 100 mbar was applied. After a reaction time of 2 hours, the reaction mixture was cooled and was then filtered after addition of 15 g filter aid and 15 g bleaching earth. Yield: 267 g of a clear yellow liquid.
Color 1" Lov. yellow=4.5, Lov. red=1.4
Acid value=0.32, saponification value=80.5, iodine value=48.2

Preparation of Test Specimens

| | | Examples | | |
|---|---|---|---|---|
| | | E3 | E4 | E5 |
| Evipol ® SH 7020 | (PVC, EVC) | 100 | 100 | 100 |
| Plastomol ® DOA | (Plasticizer, BASF) | 7 | 7 | 7 |
| Palamol ® 646 | (Plasticizer, BASF) | 15 | 15 | 15 |
| Edenol ® D 81 | (epoxid. soybean oil, Cognis) | 15 | 15 | 15 |
| Stabiol ® VCZ 2222 | (Ca/Zn stabilizer, Cognis) | 0.8 | 0.8 | 0.8 |
| Loxiol ® 2883 | | 2 | 2 | 2 |
| Ester Example 1 | (Glycerol monooleate, Cognis) | — | 1 | — |
| Ester Example 2 | | — | — | 1 |

The components were mixed together and rolled for 5 mins. at 185° C. on a laboratory roll mill. The rolled sheets were then subjected to the hot fogging test at 60° C. and to the cold fogging test at 25° C./8° C. E4 and E5 correspond to the invention.

| | Hot fogging test, 60° C. | | |
|---|---|---|---|
| Sample | Clouding of film by fine droplets after s | Formation of >5 mm droplets after s | Clear film after s |
| E3 | Immediate | >200 | >600 |
| E4 | Immediate | 60 | 140 |
| E5 | Immediate | 45 | 90 |

| | Cold fogging test, 25° C./8° C. | |
|---|---|---|
| Sample | Clouding of film by fine droplets after s | Clear film after s |
| B3 | Immediate | >600 |
| B4 | Immediate | 420 |
| B5 | Immediate | 120 |

Cold Fogging Test

This test simulates the antifogging properties of films used as packaging material for foods stored in a refrigerator. To this end, 200 ml drinking water were poured into a 250 ml glass beaker, the beaker was covered with a sample of the film to be tested and then placed in a temperature-controlled room kept at 4° C.

Hot Fogging Test

The hot fogging test simulates the antifogging properties of films used for packaging which are filled with hot or warm foods and then stored in the sealed packaging in a refrigerator. To this end, 50 ml drinking water were poured into a 250 ml glass beaker, the beaker was covered with a sample of the film to be tested and then placed in a bath heated at 60° C. The time intervals after which a change in the film became visible were then noted over a period of 600 s.

We claim:

1. An antifogging agent for plastics comprising the transesterification product of native oil with polyethylene glycol (PEG) or mixtures of PEG with polyols other than PEG wherein the resulting transesterification product is the antifogging agent.

2. The antifogging agent as claimed in claim 1, wherein, the native oil comprises a member elected from the group consisting of sunflower oil, colza oil, soybean oil, castor oil and mixtures thereof.

3. The antifogging agent as claimed in claim 1, wherein, the transesterification is catalyzed by a basic catalyst comprising at least one member selected from the group consisting of sodium hydroxide, potassium hydroxide and lithium hydroxide.

4. The antifogging agent as claimed in claim 1, wherein, the PEG comprises PEG with a molecular weight of 100 to 3,000.

5. The antifogging agent as claimed in claim 1, wherein the polyol other than PEG comprises at least one member selected from the group consisting of glycerol, TMP, sorbitol, and pentaerythritol.

6. The antifogging agent as claimed in claim 1, wherein, the ratio by weight of oil to PEG to polyol other than PEG is 10:1:0 to 1:5:1.

7. A plastic containing the antifogging agent of claim 1.

8. The plastic as claimed in claim 7 containing 0.05 to 10% by weight of the antifogging agent.

9. A method for providing antifogging properties to a plastic which comprises: incorporating in the plastic, the antifogging agent of claim 1.

10. The method of claim 9 wherein from 0.05% to 10% by weight of the antifogging agent are incorporated into the plastic based on the total weight of the antifogging agent and plastic.

11. A process for the production of an antifogging agent for plastics, which comprises:
   (a) forming a mixture comprising at least one native oil, PEG, optionally a polyol other than PEG and a base catalyst; and
   (b) transesterifying the mixture to form the antifogging agent.

12. The process of claim 11, wherein, the ratio by weight of native oil: PEG: polyol other than PEG ranges from 10:1:0 to 1:5:1.

13. The process of claim 11, wherein the polyol other than PEG comprises at least one member selected from the group consisting of glycerol, TMP, sorbitol, and pentaerythritol.

14. The process of claim 11, wherein the PEG has a molecular weight of from 100 to 3,000.

15. The process of claim 14, wherein, the PEG has a molecular weight of from 200 to 1,000.

16. The process of claim 11, wherein the transesterification is carried out in a one pot reactor.

17. The antifogging agent of claim 4 wherein the PEG has a molecular weight of from 200 to 1,000.

18. A plastic comprising the transesterification product of native oil with polyethylene glycol (PEG) or mixtures of PEG with polyols other than PEG wherein the resulting transesterification product is the antifogging agent.

19. The plastic as claimed in claim 18, wherein, the native oil of the transesterification product comprises a member elected from the group consisting of sunflower oil, colza oil, soybean oil, castor oil and mixtures thereof.

20. The plastic as claimed in claim 18, wherein, the transesterification is catalyzed by a basic catalyst comprising at least one member selected from the group consisting of sodium hydroxide, potassium hydroxide and lithium hydroxide.

21. The plastic as claimed in claim 18, wherein, the PEG of the transesterification product comprises PEG with a molecular weight of 100 to 3,000.

22. The plastic as claimed in claim 18, wherein the polyol other than PEG, of the transesterification product, comprises at least one member selected from the group consisting of glycerol, TMP, sorbitol, and pentaerythritol.

23. The plastic as claimed in claim 18, wherein the transesterification product has a ratio by weight of oil to PEG to polyol other than PEG is 10:1:0 to 1:5:1.

\* \* \* \* \*